(12) United States Patent  
Tatekawa et al.

(10) Patent No.: US 6,369,669 B1
(45) Date of Patent: Apr. 9, 2002

(54) RARE-EARTH CERAMIC FILTER

(75) Inventors: Tsutomu Tatekawa, Otsu; Hitoshi Takagi, Omihachiman, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/689,317

(22) Filed: Oct. 12, 2000

(30) Foreign Application Priority Data

Oct. 12, 1999 (JP) ............................................. 11-289898
Oct. 12, 1999 (JP) ............................................. 11-289899
Jul. 21, 2000 (JP) ............................................. 12-221103

(51) Int. Cl.$^7$ ............................................. H01P 1/202
(52) U.S. Cl. ............................................. 333/134; 333/206
(58) Field of Search ............................................. 501/135; 333/206, 333/134

(56) References Cited

U.S. PATENT DOCUMENTS 3,785,834 A * 1/1974 Rapp ........................... 106/39.6
4,670,409 A * 6/1987 Okawa et al. ............... 501/135
6,093,338 A * 7/2000 Tani et al. .................. 252/62.9 R
6,304,159 B1 * 10/2001 One et al. ................... 333/206

* cited by examiner

Primary Examiner—Justin P. Bettendorf
Assistant Examiner—Joseph Chang
(74) Attorney, Agent, or Firm—Ostrolenk, Faber, Gerb & Soffen

(57) ABSTRACT

High frequency dielectric ceramic compositions having a dielectric constant ($\in_r$) of 30 to 50, a Q value of 15,000 or more at 1 GHz, and a temperature-dependent factor of resonant frequency ($\tau f$) which can be arbitrarily controlled centering around 0 (ppm/° C.) have a main crystal of the perovskite type crystal phase by $(1-x)MeTi_aO_{1+2a}-xLn(Ma_{1/2}Mb_{1/2})_bO_{(3+3b)/2}$, wherein Ln is a rare earth element, Ma is at least one of Mg and Zn, Mb is at least one of Sn and Zr, Me is at least one of Ca and Sr, x is the mole fraction, and $0.95 \leq a \leq 1.05$, $0.9 \leq b \leq 1.05$ and $0.3 \leq x \leq 0.5$.

20 Claims, 3 Drawing Sheets

RARE-EARTH CERAMIC FILTER

BACKGROUND OF THE INVENTION

1. Field of the Invention

The present invention relates to high frequency dielectric ceramic compositions and relates to dielectric resonators, dielectric filters, dielectric duplexers and communication apparatuses using said compositions.

2. Description of the Related Art

Dielectric ceramics have been widely used as materials for dielectric resonators, dielectric filters and circuit substrates in electronic equipment, for example, cellular phones, personal radios and satellite broadcasting receivers utilizing high frequencies such as microwaves and milliwaves.

Dielectric properties required of such high frequency dielectric ceramic compositions are preferably:

(1) the relative dielectric constant ($\in_r$) is large in order to respond to the requirement for miniaturization because the wavelength of electromagnetic wave is shortened to $1/(\in_r)1/2$ in the dielectric, (2) dielectric loss is small, or Q value is large, and (3) temperature stability of resonant frequency is superior, or temperature-dependent factor of resonant frequency ($\tau f$) is close to 0 (ppm/°C.).

As these types of dielectric ceramic compositions, $Ba(Zn,Ta)O_3$ series (Japanese Examined Patent Application Publication No. 58-25068), $Ba(SN,Mg,Ta)O_3$ series (Japanese Examined Patent Application Publication No. 3-34164), $(Zr,Sn)TiO_4$ series (Japanese Examined Patent Application Publication No. 4-59267), $Ba_2Ti_9O_{20}$ (Japanese Unexamined Patent Application Publication No. 61-10806) and other dielectric ceramic compositions have been disclosed.

However, materials of the $Ba(Zn,Ta)O_3$ series and the $Ba(SN,Mg,Ta)O_3$ series have very large Q values of 150,000 to 300,000 at 1 GHz but have relatively small relative dielectric constants ($\in_r$) of 24 to 30.

Materials of the $(Zr,Sn)TiO_4$ series and the $Ba_2Ti_9O_{20}$ series have relatively large relative dielectric constants ($\in_r$) of 37 to 40 and large Q values of 50,000 to 60,000 at 1 GHz, but it is difficult to realize larger relative dielectric constants ($\in_r$) of, for example, more than 40.

In recent years, requirements for loss minimization and miniaturizing of electronic equipment have been intensified. Accompanying this, regarding dielectric materials, requirements for developing materials having further superior dielectric properties, especially both large relative dielectric constants ($\in_r$) and large Q value, have been intensified. Such requirements, however, have not been met up until now.

SUMMARY OF THE INVENTION

Accordingly, it is an object of the present invention to provide high frequency dielectric ceramic compositions having a relative dielectric constant ($\in_r$) of 30 to 50, Q values of 15,000 or more at 1 GHz, and temperature-dependent factors of resonant frequency ($\tau f$) which can be arbitrarily controlled centering around 0 (ppm/°C.). It is another object of the present invention to provide dielectric resonators, dielectric filters, dielectric duplexers and communication apparatuses using the compositions.

To achieve the aforementioned objects, a high frequency dielectric ceramic composition of the present invention is characterized in including a rare earth element (Ln), Ma which is at least one selected from the group consisting of Mg and Zn, Mb which is at least one selected from the group consisting of Sn and Zr, and Ti and Me which is at least one selected from the group consisting of Ca and Sr, the dielectric ceramic having a composition shown by the formula $$(1-x)MeTi_aO_{1+2a} - xLn(Ma_{1/2}Mb_{1/2})_bO_{(3+3b)/2},$$

wherein x is the mole fraction and a, b, and x are within the ranges $0.950 \leq a \leq 1.050$, $0.900 \leq b \leq 1.050$, and $0.300 \leq x \leq 0.500$, and the dielectric ceramic having a main crystal of the perovskite type crystal phase.

The aforementioned rare earth element (Ln) may be at least one selected from the group consisting of Y, La, Pr, Nd and Sm.

The aforementioned Me may be Ca, and the aforementioned Ma may be Mg.

A dielectric resonator of the present invention is actuated by the electromagnetic connection of input/output terminals and a dielectric ceramic is characterized in that the dielectric ceramic is composed of a high frequency dielectric ceramic composition of the present invention.

A dielectric filter of the present invention is characterized in being composed of the aforementioned dielectric resonator including an outer connection unit.

A dielectric duplexer of the present invention including at least two dielectric filters, input/output connection units connected to each dielectric filter, and an antenna connection unit commonly connected to the dielectric filters is characterized in that at least one of aforementioned dielectric filters is a dielectric filter of the present invention.

A communication apparatus of the present invention is characterized in including a dielectric duplexer of the present invention; a transmitting circuit connected to at least one input/output connection unit of the dielectric duplexers; a receiving circuit connected to at least one input/output connection unit which is different from said input/output connection unit connected to the transmitting circuit; and an antenna connected to the antenna connection unit of the dielectric duplexer.

DESCRIPTION OF THE PREFERRED EMBODIMENTS

Figure 1:
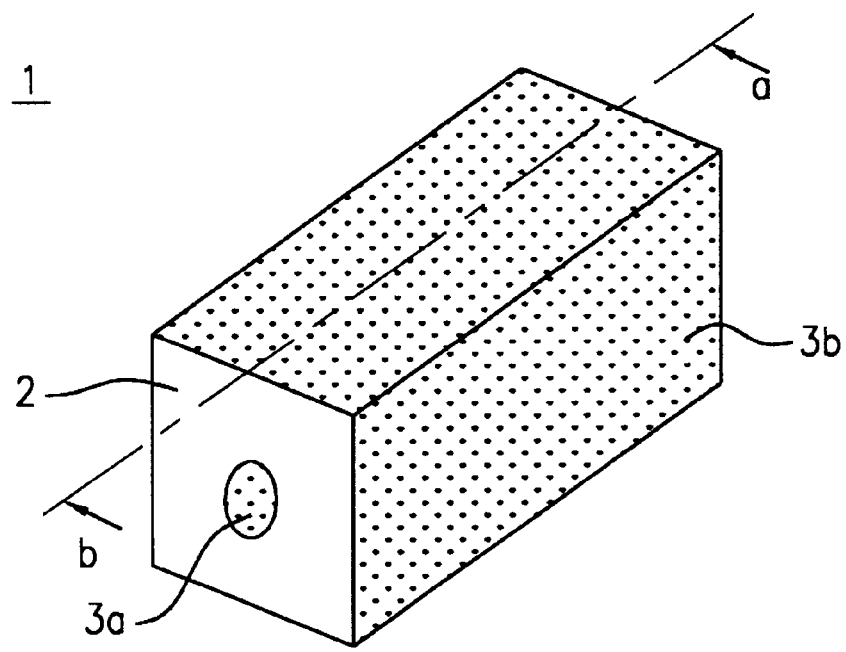
FIG. 1 is a perspective view of a dielectric resonator according to an embodiment of the present invention.
Figure 2:
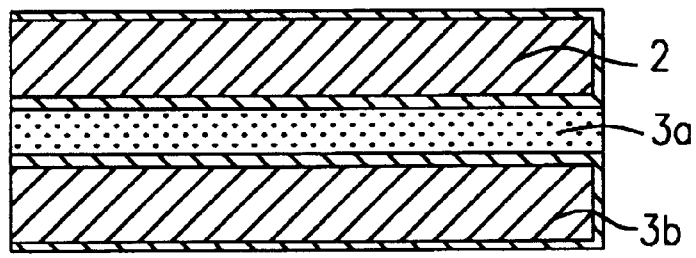
FIG. 2 is a sectional view along the a-b side of the dielectric resonator shown in FIG. 1.

FIG. 1 shows a perspective view of a dielectric resonator according to an embodiment of the present invention, and FIG. 2 is a sectional view along the a-b side of the dielectric resonator 1 shown in FIG. 1. Referring to FIGS. 1 and 2, a dielectric resonator 1 is composed of a dielectric ceramic 2 of rectangular prism shape having a penetrating hole. An inner conductor 3a is formed in the penetrating hole and an outer conductor 3b is formed on the circumference of the dielectric ceramic 2. Then an input/output terminal or an outer connection unit is connected to the dielectric ceramic 2 by electromagnetic connection and the dielectric ceramic 2 actuates as a dielectric resonator. The dielectric ceramic 2 constituting such a dielectric resonator 1 is composed of a high frequency dielectric ceramic composition of the present invention.

FIG. 1 shows an embodiment of TEM mode dielectric resonators of rectangular prism shape; however, the present invention is not limited to this. High frequency dielectric ceramic compositions of the present invention can be also used for dielectric resonators of other shapes, other TEM modes, TM modes, TE modes and so forth.

Figure 3:
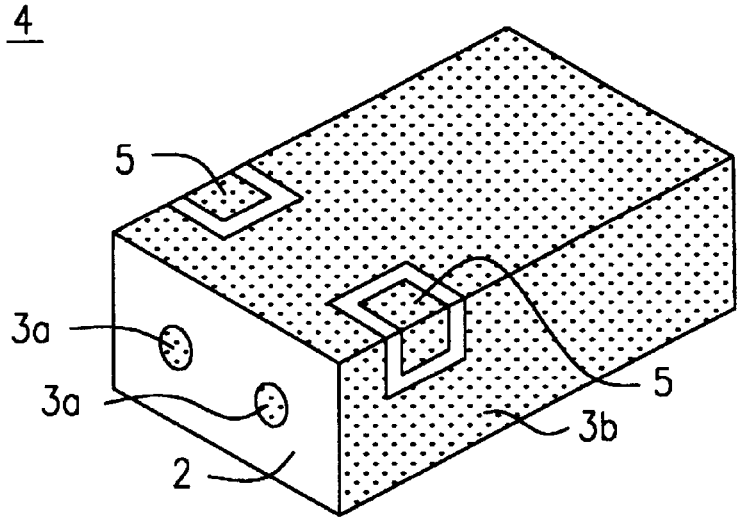
FIG. 3 is a perspective view of a dielectric filter according to an embodiment of the present invention.

FIG. 3 is a perspective view of a dielectric filter according to an embodiment of the present invention. Referring to FIG. 3, a dielectric filter 4 is prepared by forming outer connection units 5 onto a dielectric resonator prepared by forming an inner conductor 3a and an outer conductor 3b on a dielectric ceramic 2 having a penetrating hole. FIG. 3 shows a block type dielectric filter; however, dielectric filters of the present invention can be also discrete type dielectric filters.

Figure 4:
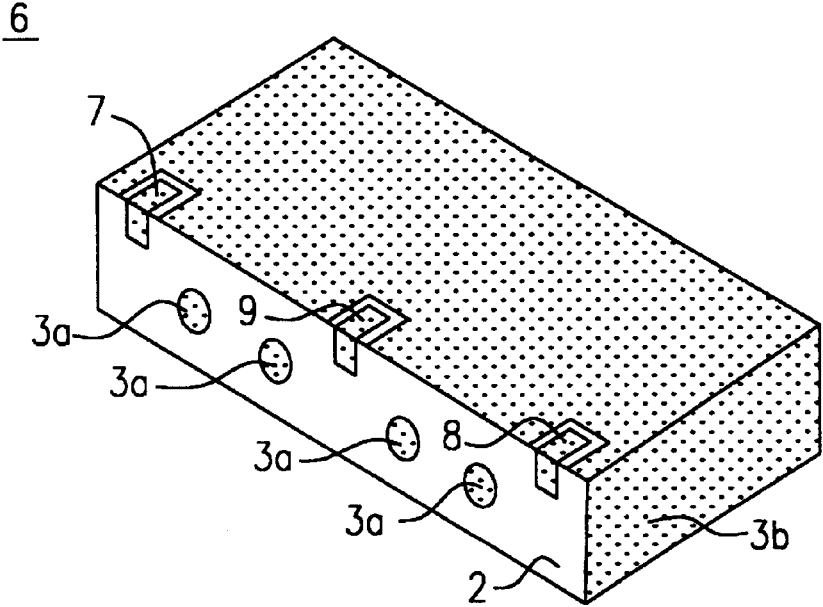
FIG. 4 is a perspective view of a dielectric duplexer according to an embodiment of the present invention.

FIG. 4 is a perspective view of a dielectric duplexer according to an embodiment of the present invention. Referring to FIG. 4, a dielectric duplexer 6 includes two dielectric filters provided with a dielectric resonator prepared by forming an inner conductor 3a and an outer conductor 3b on a dielectric ceramic 2 having a penetrating hole, an input connection unit 7 connected to one of the dielectric filters, an output connection unit 8 connected to another dielectric filter, and antenna connection unit 9 commonly connected to these dielectric filters. FIG. 4 shows a block type dielectric duplexer; however dielectric duplexers of the present invention can also be discrete type dielectric duplexers.

Figure 5:
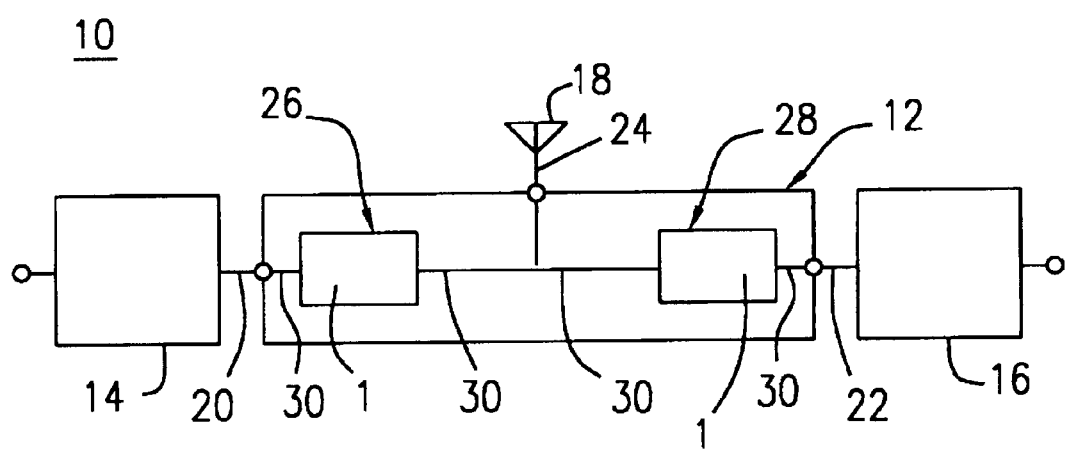
FIG. 5 is a block diagram of a communication apparatus according to an embodiment of the present invention.

FIG. 5 is a block diagram of a communication apparatus according to an embodiment of the present invention. The communication apparatus 10 includes a dielectric duplexer 12, a transmitting circuit 14, a receiving circuit 16 and an antenna 18. The transmitting circuit 14 is connected to an input connection unit 20 of the dielectric duplexer 12 and the receiving circuit 16 is connected to an output connection unit 22 of the dielectric duplexer 12. The antenna 18 is connected to an antenna connection unit 24 of the dielectric duplexer 12. The dielectric duplexer 12 includes two dielectric filters 26 and 28. The dielectric filters 26 and 28 are prepared by forming outer connection units onto dielectric resonators of the present invention. In this embodiment, for example, the dielectric filters are prepared by connecting the outer connection units 30 to each input/output terminal of the dielectric resonators 1. Then one of the dielectric filters 26 is connected between the input connection unit 20 and another dielectric filter 28, and such another dielectric filter 28 is connected between the other dielectric filter 26 and the output connection unit 22.

As mentioned above, high frequency dielectric ceramic compositions of the present invention include: a rare earth element (Ln); Ma, wherein Ma is at least one selected from the group consisting of Mg and Zn; Mb, wherein Mb is at least one selected from the group consisting of Sn and Zr; and Ti and Me, wherein Me is at least one selected from the group consisting of Ca and Sr, and have a composition shown by the formula

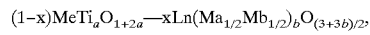

$(1-x)\text{MeTi}_aO_{1+2a}$—$x\text{Ln}(\text{Ma}_{1/2}\text{Mb}_{1/2})_bO_{(3+3b)/2}$, wherein x is a mole fraction and a, b, and x are within the range as follows.

Regarding a, the range is preferably $0.95 \leq a \leq 1.05$. In the case in which $a<0.95$ or $a>1.05$, Q values may be lowered and it may be difficult to achieve the objects of the present invention.

Regarding b, the range is preferably $0.9 \leq b \leq 1.05$. In the case in which $b<0.9$ or $b>1.05$, Q values may be lowered.

Regarding x, the range is preferably $0.3 \leq x \leq 0.5$. In the case in which $x<0.3$, temperature-dependent factors of resonant frequency (τf) may increase to more than +50 ppm/°C., and in the case in which $x>0.5$, temperature-dependent factors of resonant frequency (τf) may become lower than −50 ppm/°C.

Regarding high frequency dielectric ceramic compositions of this invention, as Mb, at least one of Sn and Zr is properly adopted.

As a rare earth element (Ln), Y, La, Ce, Pr, Nd, Pm, Sm, Eu, Gd, Tb, Dy, Ho, Er, Tm, Yb and Lu are usable, and among these, at least one of Y, La, Pr, Nd and Sm is preferred to obtain larger relative dielectric constants ($\in_r$) and Q values.

As Me, at least one of Ca and Sr is preferable, and Ca is more preferable. As Ma, at least one of Mg and Zn is preferable, and Mg is more preferable. Larger relative dielectric constants ($\in_r$) and Q values can be obtained when Ca is adopted as Me and Mg is adopted as Ma.

The present invention will be illustrated by the following concrete examples.

EXAMPLE 1

In this case, Sn was adopted as Mb in the high frequency dielectric ceramic compositions of the present invention.

As starting materials, high purity calcium carbonate ($CaCO_3$), strontium carbonate ($SrCO_3$), titanium oxide ($TiO_2$), rare-earth oxide (such as $La_2O_3$), magnesium oxide (MgO), zinc oxide (ZnO) and tin oxide ($SnO_2$) were prepared. Then these starting materials were mixed properly to obtain compositions shown in Table 1 by the formula $(1-x)\text{MeTi}_aO_{1+2a}$—$x\text{La}(\text{Ma}_{1/2}\text{Sn}_{1/2})_bO_{(3+3b)/2}$ wherein x is the mole fraction. These starting materials were also mixed properly to obtain compositions shown in Table 2 by the formula $0.65\text{CaTiO}_3 0.35\text{Ln}(\text{Mg}_{1/2}\text{Sn}_{1/2})O_3$.

TABLE 1

$(1-x)\text{METi}_aO_{1+2a}$-$x\text{La}(\text{Ma}_{1/2}\text{Sn}_{1/2})_bO_{(3+3b)/2}$ Series

| Sample No. | Me | Ma | a | b | x | Relative Dielectric Constant $\epsilon r$ | Q Value 1 GHz | Temperature Dependent Factor of Resonant Frequency τf (ppm/° C.) |
|---|---|---|---|---|---|---|---|---|
| *1 | Ca | Mg | 1.000 | 1.000 | 0.250 | 51.4 | 15300 | 56 |
| 2 | Ca | 0.8Mg 0.2Zn | 1.000 | 1.000 | 0.300 | 48.2 | 15500 | 32 |
| 3 | Ca | Mg | 1.000 | 1.000 | 0.300 | 47.3 | 19700 | 38 |
| *4 | Ca | Mg | 0.900 | 1.000 | 0.350 | 43.0 | 10300 | 13 |

TABLE 1-continued $(1 - x)METi_aO_{1+2a}-xLa(Ma_{1/2}Sn_{1/2})_bO_{(3+3b)/2}$ Series

| Sample No. | Me | Ma | a | b | x | Relative Dielectric Constant $\epsilon_r$ | Q Value 1 GHz | Temperature Dependent Factor of Resonant Frequency $\tau f$ (ppm/° C.) |
|---|---|---|---|---|---|---|---|---|
| 5 | Ca | Mg | 0.950 | 1.000 | 0.350 | 43.2 | 23900 | 12 |
| *6 | Ca | Mg | 1.000 | 0.850 | 0.350 | 43.2 | 10100 | 14 |
| 7 | Ca | Mg | 1.000 | 0.900 | 0.350 | 43.1 | 28000 | 13 |
| 8 | Ca | Mg | 1.000 | 1.000 | 0.350 | 43.2 | 28200 | 12 |
| 9 | Ca | Mg | 1.000 | 1.050 | 0.350 | 43.0 | 26300 | 13 |
| *10 | Ca | Mg | 1.000 | 1.100 | 0.350 | 43.1 | 9800 | 12 |
| 11 | Ca | Mg | 1.050 | 1.000 | 0.350 | 43.2 | 17200 | 12 |
| *12 | Ca | Mg | 1.100 | 1.000 | 0.350 | 43.1 | 6500 | 14 |
| 13 | Ca | 0.8Mg 0.2Zn | 1.000 | 1.000 | 0.400 | 39.7 | 33100 | −16 |
| 14 | Ca | Mg | 1.000 | 1.000 | 0.400 | 39.0 | 39900 | −12 |
| 15 | Ca | Mg | 1.000 | 1.000 | 0.450 | 35.8 | 35100 | −31 |
| 16 | Ca | Mg | 1.000 | 1.000 | 0.500 | 30.3 | 36000 | −48 |
| *17 | Ca | Mg | 1.000 | 1.000 | 0.550 | 26.4 | 37100 | −63 |
| *18 | 0.8Ca 0.2Sr | Mg | 0.900 | 1.000 | 0.350 | 40.6 | 9300 | 15 |
| 19 | 0.8Ca 0.2Sr | Mg | 0.950 | 1.000 | 0.350 | 40.3 | 18300 | 13 |
| *20 | 0.8Ca 0.2Sr | Mg | 1.000 | 0.850 | 0.350 | 40.1 | 12100 | 14 |
| 21 | 0.8Ca 0.2Sr | Mg | 1.000 | 0.900 | 0.350 | 40.3 | 22900 | 16 |
| 22 | 0.8Ca 0.2Sr | Mg | 1.000 | 1.000 | 0.350 | 40.6 | 23600 | 16 |
| 23 | 0.8Ca 0.2Sr | Mg | 1.000 | 1.050 | 0.350 | 40.2 | 21300 | 15 |
| *24 | 0.8Ca 0.2Sr | Mg | 1.000 | 1.100 | 0.350 | 40.3 | 11000 | 14 |
| 25 | 0.8Ca 0.2Sr | Mg | 1.050 | 1.000 | 0.350 | 40.1 | 20600 | 15 |
| *26 | 0.8Ca 0.2Sr | Mg | 1.100 | 1.000 | 0.350 | 40.2 | 7500 | 13 |

TABLE 2

$0.65CaTiO_3 - 0.35Ln(Mg_{½}Sn_{½})O_3$ Series

| Sample No. | Rare-Earth Element (Ln) | Relative Dielectric Constant $\epsilon_r$ | Q Value 1 GHz | Temperature-Dependent Factor of Resonant Frequency $\tau f$ (ppm/° C.) | Remark |
|---|---|---|---|---|---|
| 27 | Y | 41.3 | 27800 | 11 | Corresponds to Sample 8 in Table 1 except for Ln |
| 28 | 0.1Y 0.9La | 42.9 | 27800 | 12 | |
| 29 | 0.3Y 0.7La | 42.3 | 27800 | 12 | |
| 30 | Pr | 42.9 | 28300 | 13 | |
| 31 | 0.1Pr 0.9La | 43.1 | 28100 | 14 | |
| 32 | 0.3Pr 0.7La | 42.7 | 28400 | 13 | |
| 33 | Nd | 42.5 | 29100 | 13 | |
| 34 | 0.1Nd 0.9La | 42.8 | 27600 | 14 | |
| 35 | 0.3Nd 0.7La | 42.1 | 28100 | 13 | |
| 36 | Sm | 41.3 | 29300 | 16 | |
| 37 | 0.1Sm 0.9La | 42.6 | 28400 | 15 | |
| 38 | 0.3Sm 0.7La | 42.1 | 28600 | 14 | |

Samples 27 to 38 shown in Table 2 adopted various rare-earth elements indicated in the column "Rare-Earth Element" instead of La in the compositional formula shown in Table 1, and otherwise had compositions corresponding to Sample No. 8 in Table 1.

Then, powders of these mixed starting materials were wet-mixed for 16 hours using a ball mill, dehydrated, dried, and thereafter were calcined at 1100 to 1300° C. for 3 hours. After the addition of a proper amount of binder, the calcined powders were wet-milled for 16 hours using a ball mill to obtain prepared powders.

The prepared powders were then press molded at a pressure of 1000 to 2000 kg/cm² into disks and were fired at a temperature of 1400 to 1500° C. for 4 to 10 hours in the air to obtain ceramics 10 mm in diameter and 5 mm thick having a main crystal of the perovskite type crystal phase.

Relative dielectric constants ($\epsilon_r$) at a measuring frequency of 6 to 8 GHz and Q values of obtained ceramics were determined by both end surfaces short-circuited type dielectric resonator method, and according to the rule that Q×f=constant, Q values were converted to values at 1 GHz. Temperature-dependent factors of resonant frequency ($\tau f$) between at 25° C. to 55° C. were determined based on TE01δ mode resonator frequency. These results are shown in Tables 1 and 2. In Table 1, asterisked sample numbers indicate Samples which are out of the scope of the present invention.

Tables 1 and 2 clearly show that according to samples within the scope of the present invention, it is possible to obtain large Q values while relative dielectric constants ($\epsilon_r$) are maintained at large values in the microwave band.

Referring mainly to Table 1, reasons of limitation of the invented compositions shown by the compositional formula of $$(1-x)\mathrm{MeTi}_a\mathrm{O}_{1+2a}\text{—}x\mathrm{Ln}(\mathrm{Ma}_{1/2}\mathrm{Sn}_{1/2})_b\mathrm{O}_{(3+3b)/2},$$

wherein Ln is a rare-earth element, Ma is at least one of Mg and Zn, Me is at least one of Ca and Sr, and x is the mole fraction, are illustrated as follows.

Regarding a, the range is preferably $0.95 \leq a \leq 1.05$. In the case in which $a<0.95$ as shown by Sample Nos. 4 and 18 and in the case in which $a>1.05$ as shown by Sample Nos. 12 and 26, Q values are both lowered, and it may be difficult to achieve the objects of the present invention.

Regarding b, the range is preferably $0.9 \leq b \leq 1.05$. In the case in which $b<0.9$ as shown by Sample Nos. 6 and 20 and in the case in which $b>1.05$ as shown by Sample Nos. 10 and 24, Q values are both lowered.

Regarding x, the range is preferably $0.3 \leq x \leq 0.5$. In the case in which $x<0.3$ as shown by Sample No. 1, temperature-dependent factors of resonant frequency ($\tau f$) increase to more than $+50$ ppm/°C., and in the case in which $x>0.5$ as shown by Sample No. 17, temperature-dependent factors of resonant frequency ($\tau f$) become lower than $-50$ ppm/°C.

Table 2 clearly shows that when at least one of Y, La, Pr, Nd, and Sm is adopted instead of La alone shown in Table 1 as the rare-earth element, properties equal to the case of La alone can be obtained.

EXAMPLE 2

In this case, Zr was adopted as Mb in the high frequency dielectric ceramic compositions of the present invention.

As starting materials, high purity calcium carbonate ($CaCO_3$), strontium carbonate ($SrCO_3$), titanium oxide ($TiO_2$), rare-earth oxide (such as $La_2O_3$), magnesium oxide (MgO), zinc oxide (ZnO) and zirconium oxide ($ZrO_2$) were prepared. Then these starting materials were mixed properly to obtain compositions shown in Table 3 by the formula $(1-x)\mathrm{MeTi}_a\mathrm{O}_{1+2a}\text{—}x\mathrm{La}(\mathrm{Ma}_{1/2}\mathrm{Zr}_{1/2})_b\mathrm{O}_{(3+3b)/2}$ wherein x is the mole fraction. These starting materials were also mixed properly to obtain compositions shown in Table 4 by the formula $0.6\mathrm{CaTiO}_3\text{-}0.4\mathrm{Ln}(\mathrm{Mg}_{1/2}\mathrm{Zr}_{1/2})\mathrm{O}_3$.

TABLE 3

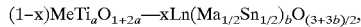

$(1 - x)\mathrm{METi}_a\mathrm{O}_{1+2a}\text{-}x\mathrm{La}(\mathrm{Ma}_{1/2}\mathrm{Zr}_{1/2})_b\mathrm{O}_{(3+3b)/2}$ Series

| Sample No. | Me | Ma | a | b | x | Relative Dielectric Constant $\epsilon r$ | Q Value 1 GHz | Temperature Dependent Factor of Resonant Frequency $\tau f$ (ppm/° C.) |
|---|---|---|---|---|---|---|---|---|
| *39 | Ca | Mg | 1.000 | 1.000 | 0.275 | 57.2 | 14700 | 55 |
| 40 | Ca | 0.8Mg 0.2Zn | 1.000 | 1.000 | 0.300 | 55.0 | 18900 | 41 |
| 41 | Ca | Mg | 1.000 | 1.000 | 0.300 | 54.3 | 21000 | 46 |
| 42 | Ca | Mg | 1.000 | 1.000 | 0.325 | 52.0 | 24600 | 37 |
| 43 | Ca | Mg | 1.000 | 1.000 | 0.350 | 49.4 | 27400 | 29 |
| 44 | Ca | Mg | 1.000 | 1.000 | 0.375 | 46.7 | 28400 | 14 |
| *45 | Ca | Mg | 0.900 | 1.000 | 0.400 | 44.8 | 12100 | 3 |
| 46 | Ca | Mg | 0.950 | 1.000 | 0.400 | 44.9 | 26900 | 3 |
| *47 | Ca | Mg | 1.000 | 0.850 | 0.400 | 44.8 | 14300 | 3 |
| 48 | Ca | Mg | 1.000 | 0.900 | 0.400 | 44.8 | 30200 | 4 |
| 49 | Ca | Mg | 1.000 | 1.000 | 0.400 | 44.9 | 29600 | 3 |
| 50 | Ca | Mg | 1.000 | 1.050 | 0.400 | 44.7 | 27600 | 4 |
| *51 | Ca | Mg | 1.000 | 1.100 | 0.400 | 44.8 | 11600 | 2 |
| 52 | Ca | Mg | 1.050 | 1.000 | 0.400 | 44.8 | 22700 | 3 |
| *53 | Ca | Mg | 1.100 | 1.000 | 0.400 | 44.7 | 9800 | 4 |
| 54 | Ca | Mg | 1.000 | 1.000 | 0.425 | 43.1 | 27200 | −16 |
| 55 | Ca | 0.8Mg 0.2Zn | 1.000 | 1.000 | 0.425 | 43.1 | 27200 | −16 |
| 56 | Ca | Mg | 1.000 | 1.000 | 0.450 | 40.5 | 31700 | −25 |
| 57 | Ca | Mg | 1.000 | 1.000 | 0.475 | 38.8 | 33000 | −33 |
| 58 | Ca | Mg | 1.000 | 1.000 | 0.500 | 36.4 | 34800 | −46 |
| *59 | Ca | Mg | 1.000 | 1.000 | 0.550 | 34.3 | 35600 | −57 |
| *60 | 0.8Ca 0.2Sr | Mg | 0.900 | 1.000 | 0.400 | 42.4 | 12000 | 6 |
| 61 | 0.8Ca 0.2Sr | Mg | 0.950 | 1.000 | 0.400 | 42.5 | 19600 | 6 |
| *62 | 0.8Ca 0.2Sr | Mg | 1.000 | 0.850 | 0.400 | 42.4 | 7600 | 7 |
| 63 | 0.8Ca 0.2Sr | Mg | 1.000 | 0.900 | 0.400 | 42.4 | 21300 | 6 |
| 64 | 0.8Ca 0.2Sr | Mg | 1.000 | 1.000 | 0.400 | 42.5 | 23900 | 7 |
| 65 | 0.8Ca 0.2Sr | Mg | 1.000 | 1.005 | 0.400 | 42.5 | 22300 | 6 |
| *66 | 0.8Ca 0.2Sr | Mg | 1.000 | 1.100 | 0.400 | 42.4 | 10600 | 7 |

TABLE 3-continued $(1-x)MeTi_aO_{1+2a}-xLa(Ma_{1/2}Zr_{1/2})_bO_{(3+3b)/2}$ Series

| Sample No. | Me | Ma | a | b | x | Relative Dielectric Constant $\epsilon_r$ | Q Value 1 GHz | Temperature Dependent Factor of Resonant Frequency $\tau f$ (ppm/° C.) |
|---|---|---|---|---|---|---|---|---|
| 67 | 0.8Ca 0.2Sr | Mg | 1.050 | 1.000 | 0.400 | 42.6 | 17000 | 7 |
| *68 | 0.8Ca 0.2Sr | Mg | 1.100 | 1.000 | 0.400 | 42.5 | 7200 | 8 |

TABLE 4

$0.6CaTiO_3 - 0.4Ln(Mg_{1/2}Zr_{1/2})O_3$ Series

| Sample No. | Rare-Earth Element (Ln) | Relative Dielectric Constant $\epsilon_r$ | Q Value 1 GHz | Temperature-Dependent Factor of Resonant Frequency $\tau f$ (ppm/° C.) | Remark |
|---|---|---|---|---|---|
| 69 | Y | 43.8 | 28600 | 3 | Corresponds to Sample 49 in Table 3 except for Ln |
| 70 | 0.1Y 0.1La | 44.7 | 28300 | 3 | |
| 71 | 0.3Y 0.7La | 44.2 | 27900 | 2 | |
| 72 | Pr | 44.4 | 28900 | 3 | |
| 73 | 0.1Pr 0.9La | 44.7 | 28600 | 4 | |
| 74 | 0.3Pr 0.7La | 44.3 | 28300 | 3 | |
| 75 | Nd | 44.0 | 30100 | 2 | |
| 76 | 0.1Nd 0.9La | 44.6 | 29600 | 3 | |
| 77 | 0.3Nd 0.7La | 44.2 | 29500 | 3 | |
| 78 | Sm | 43.2 | 28900 | 6 | |
| 79 | 0.1Sm 0.9La | 44.3 | 28600 | 5 | |
| 80 | 0.3Sm 0.7La | 43.9 | 28400 | 5 | |

Samples Nos. 69 to 80 shown in Table 4 adopted various rare-earth elements indicated in the column "Rare-Earth Element" instead of La in the compositional formula in Table 3, and had compositions corresponding to Sample No. 49 in Table 3.

Then, powders of these mixed starting materials were wet-mixed for 16 hours using a ball mill, dehydrated, dried and were thereafter calcined at 1100 to 1300° C. for 3 hours. After the addition of a proper amount of binder, the calcined powders were wet-milled for 16 hours using a ball mill to obtain prepared powders.

The prepared powders were then press molded at a pressure of 1000 to 2000 kg/cm² into disks and were fired at a temperature of 1300 to 1400° C. for 4 to 10 hours in the air to obtain ceramics 10 mm in diameter and 5 mm thick having a main crystal of the perovskite type crystal phase.

Relative dielectric constants ($\epsilon_r$) at a measuring frequency of 6 to 8 GHz and Q values of obtained ceramics were determined by both end surfaces short-circuited type dielectric resonator method, and according to the rule that Q×f=constant, Q values were converted to values at 1 GHz. Temperature-dependent factors of resonant frequency ($\tau f$) between at 25° C. to 55° C. were determined based on TE01δ mode resonator frequency. These results are shown in Tables 3 and 4. In Table 3, asterisked sample numbers indicate Samples which are out of the scope of the present invention.

Tables 3 and 4 clearly show that according to samples within the scope of the present invention, it is possible to obtain large Q values while relative dielectric constants ($\epsilon_r$) are maintained at large values in the microwave band.

Referring mainly to Table 3, reasons for limitations of the invented compositions shown by the formula

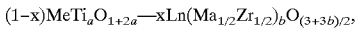

$(1-x)MeTi_aO_{1+2a}—xLn(Ma_{1/2}Zr_{1/2})_bO_{(3+3b)/2}$, wherein Ln is a rare-earth element, Ma is at least one of Mg and Zn, Me is at least one of Ca and Sr, and x is the mole fraction, are explained as follows.

Regarding a, the range is preferably $0.95 \leq a \leq 1.05$. In the case in which a<0.95 as shown by Sample Nos. 45 and 60 and in the case in which a>1.05 as shown by Sample Nos. 53 and 68, Q values are both lowered and it may be difficult to achieve the objects of the present invention.

Regarding b, the range is preferably $0.9 \leq b \leq 1.05$. In the case in which b<0.9 as shown by Sample Nos. 47 and 62 and in the case in which b>1.05 as shown by Sample Nos. 51 and 66, Q values are both lowered.

Regarding x, the range is preferably $0.3 \leq x \leq 0.5$. In the case in which x<0.3 as shown by Sample No. 39, temperature-dependent factors of resonant frequency ($\tau f$) increase to more than +50 ppm/°C., and in the case in which x>0.5 as shown by Sample No. 59, temperature-dependent factors of resonant frequency ($\tau f$) become lower than −50 ppm/°C.

Table 4 clearly shows that when at least one of Y, La, Pr, Nd, and Sm is adopted instead of La alone shown in Table 3 as a rare-earth element (Ln), properties equivalent to the case of La alone can be obtained.

EXAMPLE 3

In this case, Sn and Zr were adopted as Mb in the high frequency dielectric ceramic compositions of the present invention.

As starting materials, high purity calcium carbonate ($CaCO_3$), titanium oxide ($TiO_2$), lanthanum oxide ($La_2O_3$), magnesium oxide (MgO), zinc oxide (ZnO), tin oxide ($SnO_2$) and zirconium oxide ($ZrO_2$) were prepared.

Then these starting materials were mixed properly to obtain compositions shown in Table 5 by the formula $(1-x)CaTiO_3—xLa(Ma_{1/2}Mb_{1/2})O_3$ wherein x is the mole fraction.

TABLE 5

$(1 - x)CaTiO_3-xLa(Ma_{1/2}MB_{1/2})O_3$ Series

| Sample No. | Ma | Mb | x | Relative Dielectric Constant $\epsilon r$ | Q Value 1 GHz | Temperature-Dependent Factor or Resonant Frequency $\tau f$ (ppm/°C.) |
|---|---|---|---|---|---|---|
| 81 | Mg | 0.8Zr 0.2Sn | 0.35 | 48.3 | 28200 | 24 |
| 82 | Mg | 0.5Zr 0.5Sn | 0.35 | 45.9 | 27000 | 19 |
| 83 | Mg | 0.8Zr 0.2Sn | 0.40 | 43.7 | 30900 | -1 |
| 84 | Mg | 0.5Zr 0.5Sn | 0.40 | 41.8 | 34100 | -7 |
| 85 | 0.8Mg 0.2Zn | 0.5Zr 0.5Sn | 0.40 | 42.0 | 34000 | -9 |

Then, powders of these mixed starting materials were wet-mixed for 16 hours using a ball mill, dehydrated, dried and were thereafter calcined at 1100 to 1300° C. for 3 hours. After addition of the proper amount of binder, the calcined powders were wet-milled for 16 hours using a ball mill to obtain prepared powders.

The prepared powders were then press molded at a pressure of 1000 to 2000 kg/cm² into disks and were fired at a temperature of 1400 to 1500° C. for 4 to 10 hours in the air to obtain ceramics 10 mm in diameter and 5 mm thick having a main crystal of the perovskite type crystal phase.

Relative dielectric constants ($\in_r$) at a measuring frequency of 6 to 8 GHz and Q values of obtained ceramics were determined by both end surfaces short-circuited type dielectric resonator method, and according to the rule that Q×f=constant, Q values were converted to values at 1 GHz. Temperature-dependent factors of resonant frequency ($\tau f$) between 25° C. to 55° C. were determined based on TE01δ mode resonator frequency. These results are shown in Table 5.

Samples Nos. 81 to 85 in Table 5 clearly show that according to samples within the scope of the present invention wherein Mb is Sn and Zr, it is possible to keep temperature-dependent factors of resonant frequency ($\tau f$) to 0±30 ppm/°C. while Q values and relative dielectric constants ($\in_r$) are maintained at large values in the microwave band.

A small amount of additives can be added to high frequency dielectric ceramic compositions of the present invention so long as they do not hinder the attainment of the objects of the present invention. For example, by adding about 0.01 to 1.0 wt % of $SiO_2$, $MnCO_3$, $B_2O_3$, NiO, CuO, $Li_2CO_3$, etc., the firing temperature can be lowered by 20 to 30° C., preventing the degradation of properties. Moreover, by adding about 1 to 3 wt % of $Nb_2O_5$, $Ta_2O_5$, $V_2O_5$, etc., relative dielectric constants ($\in_r$) and temperature characteristics can be finely controlled and superior dielectric ceramics can be obtained.

It is clear from the above illustrations that according to the present invention, high frequency dielectric ceramic compositions can be obtained having a dielectric constant ($\in_r$) of 30 to 50, Q value of 15,000 or more at 1 GHz, and a temperature-dependent factor of resonant frequency ($\tau f$) which can be arbitrarily controlled centering around 0 (ppm/°C.). Therefore dielectric resonators, dielectric filters, dielectric duplexers and communication apparatuses having superior properties can be prepared by using dielectric ceramics having the compositions of the present invention.

What is claimed is:

1. A high frequency dielectric ceramic composition comprising perovskite type crystal phase represented by the formula

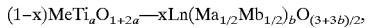

$(1-x)MeTi_aO_{1+2a}-xLn(Ma_{1/2}Mb_{1/2})_bO_{(3+3b)/2}$, wherein Ln is a rare earth element, Ma is at least one of Mg and Zn, Mb is at least one of Sn and Zr and Me is at least one of Ca and Sr, and wherein x is the mole fraction and a, b and x are within the ranges $0.95 \leq a \leq 1.05$, $0.9 \leq b \leq 1.05$, and $0.3 \leq x \leq 0.5$.

2. A high frequency dielectric ceramic composition according to claim 1, wherein said rare earth element (Ln) is at least one member selected from the group consisting of Y, La, Pr, Nd and Sm.

3. A high frequency dielectric ceramic composition according to claim 2, wherein said Me comprises Ca and said Ma comprises Mg.

4. A dielectric resonator comprising first and second input/output terminals electromagnetically connected to a dielectric ceramic, wherein said dielectric ceramic is a high frequency dielectric ceramic composition according to claim 3.

5. A dielectric filter comprising a dielectric resonator according to claim 4 in combination with an outer connection unit.

6. A dielectric duplexer comprising at least two dielectric filters, a pair of input/output connection units connected to each dielectric filter and an antenna connection unit commonly connected to said dielectric filters, wherein at least one of said dielectric filters is a dielectric filter according to claim 5.

7. A communication apparatus comprising a dielectric duplexer according to claim 6; a transmitting circuit connected to at least one input/output connection unit of said dielectric duplexer; a receiving circuit connected to at least one input/output connection unit which is different from said input/output connection unit connected to said transmitting circuit; and an antenna connected to the antenna connection unit of said dielectric duplexer.

8. A high frequency dielectric ceramic composition according to claim 1, wherein said Me comprises Ca and said Ma comprises Mg.

9. A dielectric resonator comprising first and second input/output terminals electromagnetically connected to a dielectric ceramic, wherein said dielectric ceramic is a high frequency dielectric ceramic composition according to claim 8.

10. A dielectric filter comprising a dielectric resonator according to claim 9 in combination with an outer connection unit.

11. A dielectric duplexer comprising at least two dielectric filters, a pair of input/output connection units connected to each dielectric filter and an antenna connection unit commonly connected to said dielectric filters, wherein at least one of said dielectric filters is a dielectric filter according to claim 10.

12. A communication apparatus comprising a dielectric duplexer according to claim 11; a transmitting circuit connected to at least one input/output connection unit of said dielectric duplexer; a receiving circuit connected to at least one input/output connection unit which is different from said input/output connection unit connected to said transmitting circuit; and an antenna connected to the antenna connection unit of said dielectric duplexer.

13. A dielectric resonator comprising first and second input/output terminals electromagnetically connected to a dielectric ceramic, wherein said dielectric ceramic is a high frequency dielectric ceramic composition according to claim 2.

14. A dielectric filter comprising a dielectric resonator according to claim 13 in combination with an outer connection unit.

15. A dielectric duplexer comprising at least two dielectric filters, a pair of input/output connection units connected to each dielectric filter and an antenna connection unit commonly connected to said dielectric filters, wherein at least one of said dielectric filters is a dielectric filter according to claim 14.

16. A communication apparatus comprising a dielectric duplexer according to claim 15; a transmitting circuit connected to at least one input/output connection unit of said dielectric duplexer; a receiving circuit connected to at least one input/output connection unit which is different from said input/output connection unit connected to said transmitting circuit; and an antenna connected to the antenna connection unit of said dielectric duplexer.

17. A dielectric resonator comprising first and second input/output terminals electromagnetically connected to a dielectric ceramic, wherein said dielectric ceramic is a high frequency dielectric ceramic composition according to claim 1.

18. A dielectric filter comprising a dielectric resonator according to claim 17 in combination with an outer connection unit.

19. A dielectric duplexer comprising at least two dielectric filters, a pair of input/output connection units connected to each dielectric filter and an antenna connection unit commonly connected to said dielectric filters, wherein at least one of said dielectric filters is a dielectric filter according to claim 18.

20. A communication apparatus comprising a dielectric duplexer according to claim 19; a transmitting circuit connected to at least one input/output connection unit of said dielectric duplexer; a receiving circuit connected to at least one input/output connection unit which is different from said input/output connection unit connected to said transmitting circuit; and an antenna connected to the antenna connection unit of said dielectric duplexer.

* * * * *